Patented Oct. 17, 1922.

1,432,312

UNITED STATES PATENT OFFICE.

SELMAN A. WAKSMAN, OF NEW YORK, N. Y.

PROCESS OF TREATING SILK FIBERS.

No Drawing.  Application filed February 3, 1921. Serial No. 442,277.

*To all whom it may concern:*

Be it known that I, SELMAN A. WAKSMAN, a citizen of the United States, residing in the city of New York, county of Bronx, and State of New York, have made new and useful Improvements in Processes of Treating Silk Fibers, of which the following is a specification.

This invention relates to a process of treating and de-gumming silk fibers through certain bacterial agencies whereby a more definite and expeditious result is obtained than has heretofore been possible.

In the treatment of silk fibers preparatory to de-gumming, it has been customary to soften the gum by immersing the raw silk fibers in warm water, or in a mixture of soap and oil, for a required period of time. After this preliminary softening treatment, the fiber is then immersed in a concentrated soap solution for the purpose of dissolving the gum. This process is not only expensive, but is, to some extent, injurious to the delicate silk fibers. Further, by this process, all the gum will be removed, and it is not possible to leave a certain amount of gum, as is often desirable for different grades of silk.

To, therefore, obviate these difficulties and disadvantages, it has heretofore been proposed to substitute various enzymes for the soap treatment. But all such proposed processes have met with certain difficulties, and the soap treatment is today still quite generally practiced.

I have discovered that by first softening the silk gum or sericin in any suitable manner, and under suitable conditions, it will then become available as a food for certain proteolytic bacteria which will, under favorable conditions, thrive and multiply rapidly, and in so doing, will cause disintegration of the softened gum.

My invention, therefore, includes the preparation and supplying of proper nutrient and stimulating materials in a prepared solution into which a pure culture of the selected and prepared strongly proteolytic bacterium is introduced. The supply of nutrient and stimulating material is aimed to be sufficient to cause a rapid growth of the bacteria which thereafter will continue their activity on the softened gum. My complete process, therefore, includes the softening of the gum or sericin, under proper conditions. This may be done by soaking the silk in a mixture of neat's-foot oil and olive oil soap, or in a mixture of oil and soap, which will result in softening the gum. In place of a mixture of oil and soap, hot water at about 90° to 95° C. may be used for a period of 20 to 30 minutes. The silk thus treated is then washed with warm water or steam and put into suitable vats. These vats are fitted with aerating apparatus for the purpose of supplying oxygen to the bacterial growth, and with steam pipes for regulating the temperature. The vats may be made of any suitable material not injurious to the bacterial growth, as wood, glass, metal, or the like. The raw silk fiber is then suspended in a suitable manner as on sticks, so as to hang down into the vats. Either before the silk fiber is introduced into the vat, or after the preparation is made, the vat is filled with water to which has been added the proper and necessary nutrients for stimulating bacterial growth. These nutrients may consist of peptones, potassium phosphate and magnesium sulfate. Any other salt which is useful for stimulating bacterial growth may obviously be substituted for those named above. The concentration of these nutrients varies somewhat, depending on the gum content of the silk, and on the water which is used, and the quantity in all cases should be sufficient to start a rapid growth of the bacteria which are then introduced. After the solution has been prepared and the silk softened as stated above, a pure culture of a strongly proteolytic bacterium is introduced. This culture has previously been prepared by the usual and well known bacteriological methods, and may preferably be put up in suitable containers and in suitable quantities for the silk to be treated.

The quantity of the bacterial culture to be added to the vat should be sufficient to thoroughly inoculate the solution. Any strong proteolytic bacterium may be used, such as Bacillus florescens liquefaciens, and Bacterium mycoides or other spore forming or non-spore forming types, and it is immaterial whether these are isolated from the soil, water, air or foodstuffs, the important feature being that the culture must be pure.

A suitable temperature is maintained. The entire liquid is kept preferably at 30° to 37° C. Soon after introducing the culture, the bacteria begin to multiply rapidly, first using the nutrients which have been introduced into the solution, and then attacking the sericin of the silk and decomposing it.

It is my purpose, in all cases, to introduce just sufficient nutrients to start bacterial growth, and the quantity of nutrients introduced should in no case be more than is required for this purpose. The bacteria will not attack the pure silk fiber (fibroin) or in any way injure the same. In a period of 24 to 48 hours, all the gum, or sericin, of the silk will have been dissolved off. The solution may then be removed, or, if preferred, the silk may be taken from the vats and washed with water or steam. At this point, it may in some cases be necessary to supplement the treatment with a weak soap solution, for the purpose of removing any small particles of gum and impurities that may still adhere to the fiber. In such cases, it is necessary to use but a very weak solution, and I find that one to three pounds per one hundred pounds of silk will ordinarily be sufficient. I also find that because of the practically entire disappearance of the gum, this bath can be used several times, thus greatly reducing the expense, even when a separate treatment of a soap solution is necessary. On the other hand, with the old process, it was necessary to use 20 to 30 pounds of soap for each hundred pounds of silk treated, and usually this solution could be used only once. I have found that by varying the time of incubation or silk treatment, any desired quantity of gum may be removed.

My process, therefore, results in a great saving in the cost of the soap, if soap is used at all, and in a definite result which is obtained in a very short period of time. I find that by using the bacterial process, the silk fiber will also be stronger than in the case where the soap treatment and strong alkalies are necessary.

For practical purposes, I prepare a pure culture of any one of the above named bacteria, or of any other bacteria, possesssing the desired properties, and place the same into suitable containers, in quantities sufficient to inoculate a given amount of solution properly prepared, as stated, and for degumming a definite quantity of silk fiber.

By so providing a definite culture medium for treating a definite quantity of silk under suitable conditions, as indicated above, I am enabled to standardize, not only the culture employed, but also the mode of operation, to thereby greatly facilitate the degumming process, so as to make the same certain and definite at a great saving of time and expense.

Having now set forth the object and nature of my invention, and the manner of carrying the same into operation, what I claim as new and useful and of my own invention, and desire to secure by Letters Patent, is:

1. The process of subjecting raw silk fiber to the action of strongly proteolytic bacteria to thereby degum said fibers.

2. The process of treating raw silk fibers, for the purpose of degumming the same, and improving their texture, which comprises subjecting the raw silk fibers to the action of strongly proteolytic bacteria under conditions to thereby cause a rapid development of the bacteria, and permitting said bacteria to act on the gum to free the said fibers from the gum.

3. The process of treating silk fibers for the purpose of dissolving the sericin and loosening said fibers, which consists in preparing said fibers, then subjecting the prepared fibers to the action of strongly proteolytic bacteria under proper conditions, and finally washing the silk fibers.

4. The process of treating silk material containing silk fibers and undesirable products for the purpose of freeing said fibers from the undesirable products and improving the texture, which comprises treating said material under favorable conditions, in a solution containing bacteria possessing strongly proteolytic properties and sufficient nutrients to stimulate rapid bacterial development.

5. The process of treating silk material containing silk fibers and sericin, for the purpose of freeing the fibers from the sericin, and for loosening their texture, which includes softening the silk material and treating the same in a solution containing a pure culture of bacteria possessing strongly proteolytic properties, and having been developed in said solution for the purpose of attacking the sericin and freeing the silk fibers therefom.

6. A bacterial culture preparation having strongly proteolytic properties and in concentrated form and of sufficient quantitiy to thoroughly and quickly inoculate a definite and prepared solution containing stimulating nutrients for degumming a given quantity of silk fiber placed in said prepared and inoculated solution.

In testimony whereof I have hereunto set my hand on this 15th day of December. A. D., 1920.

SELMAN A. WAKSMAN.